J. SPADAFORA.
RESILIENT TIRE.
APPLICATION FILED APR. 23, 1919.

1,347,060.

Patented July 20, 1920.

Inventor.
Joseph Spadafora
by Heard Smith & Tennant
Attys.

UNITED STATES PATENT OFFICE.

JOSEPH SPADAFORA, OF CAMBRIDGE, MASSACHUSETTS.

RESILIENT TIRE.

1,347,060.      Specification of Letters Patent.      Patented July 20, 1920.

Application filed April 23, 1919. Serial No. 292,105.

*To all whom it may concern:*

Be it known that I, JOSEPH SPADAFORA, a subject of the King of Italy, residing at Cambridge, county of Middlesex, State of Massachusetts, and whose post-office address is 414 Walden street, Cambridge, Massachusetts, have invented an Improvement in Resilient Tires, of which the following description, in connection with the accompanying drawing, is a specification, like characters on the drawing representing like parts.

This invention relates to resilient tires adapted for use on automobile wheels or wheels of other vehicles, and has for its object to provide a novel resilient tire having the features which will be more fully hereinafter set forth.

In order to give an understanding of my invention, I have illustrated in the drawings a selected embodiment thereof which will now be described, after which the novel features will be pointed out in the appended claims.

Figure 1:
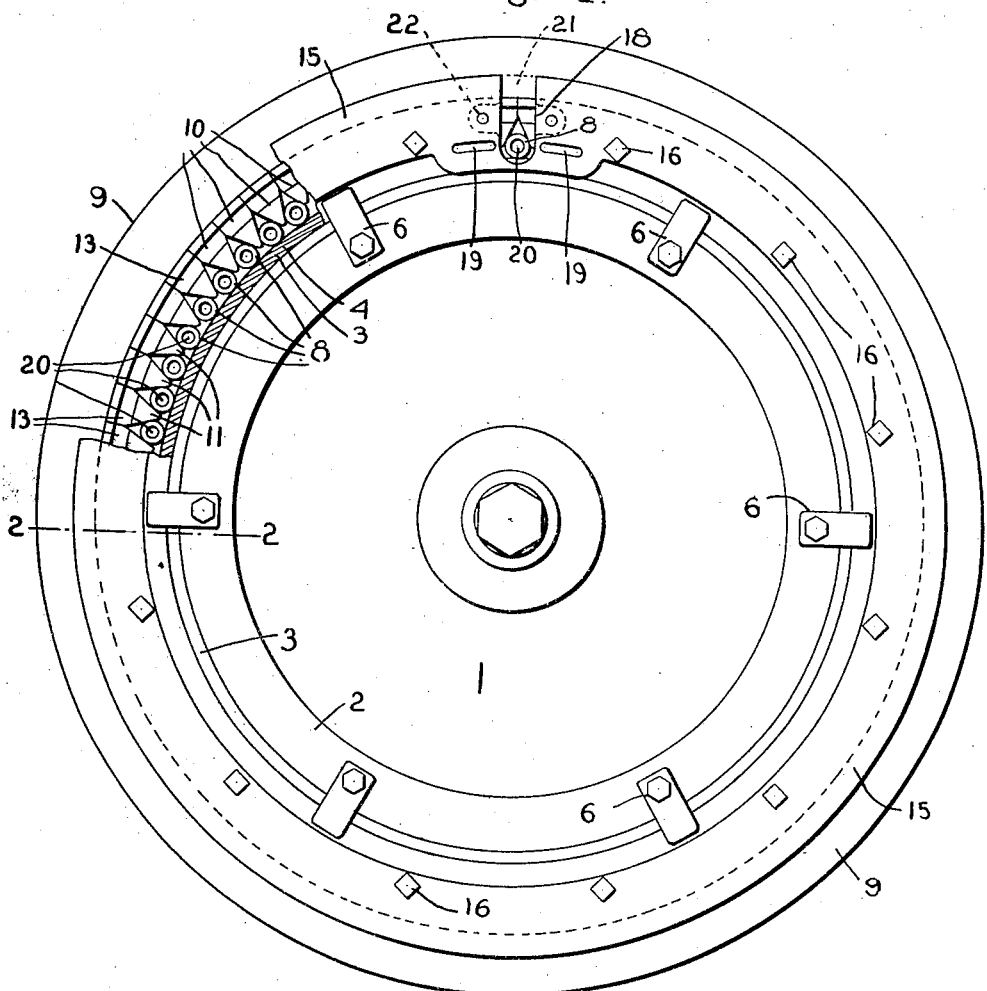
Figure 1 is a side view with a portion broken out of a wheel having my improved resilient tire thereon.
Figure 2:
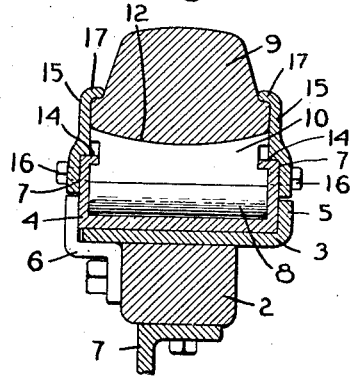
Fig. 2 is an enlarged sectional view on the line 2—2, Fig. 1.
Figure 3:
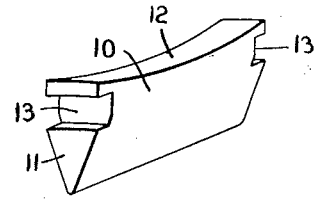
Fig. 3 is a perspective view of one of the filling members.

My improved resilient tire comprises a rim adapted to be applied to a wheel body, a plurality of rolls extending transversely of the rim and loosely resting thereon, a resilient annular tread member situated outside of the rolls, and filling members interposed between the tread member and the rolls and provided with wedge-shaped portions which enter the spaces between the rolls and bear thereagainst.

The construction is such that whenever any portion of the tread member is forced inwardly toward the center of the wheel, as will be the case in regard to the portion of the tread member which is resting on the ground and sustaining the load, the wedge-shaped portions of the filling members at this point will act on the rolls thereby spreading them and causing some adjacent portion of the tread member to be forced outwardly thereby maintaining the tread member under suitable tension at all times while providing for the desired resiliency.

The wheel body may have any suitable or usual construction and is indicated generally at 1, it being shown as of the type formed of a disk of metal which has a felly portion 2 at its peripheral edge. This felly portion 2 has an annular metal band 3 applied thereto which constitutes the stationary rim of the wheel body.

My invention may be applied either to a wheel having a demountable rim or to one having a non-demountable rim. In the drawings I have shown it as applied to a wheel having a demountable rim, and 4 indicates such demountable rim which is removably applied to the stationary rim 3. Said rim 3 is formed at one side with the positioning flange 5 against which the demountable rim 4 is positioned and is also provided with the clamping members 6 by which the demountable rim is clamped on the wheel.

9 indicates an annular tread member which is preferably made of rubber or some similar resilient material. This tread member is situated exterior to the rim 4 and encircles the latter, said tread member being spaced from the rim so as to receive the rolls and filling members above referred to. These rolls are indicated at 8 and they extend transversely of the rim 4 and rest loosely thereon. The filling members are indicated at 10 and they are interposed between the tread 9 and the rolls 8. The filling members are each provided with the back portion 12 which engages the inner face of the tread member 9 and with the wedge-shaped inwardly-directed portion 11 which enters between two adjacent rolls 8, as clearly seen in Fig. 1. The construction and arrangement of the parts is such that the normal space between the rim 4 and the inner face of the tread member 9 is greater than the radial dimension of the filling members, and as a result the pointed edges of the filling members are spaced somewhat from the rim 4, as will be seen in Fig. 1. These filling members are arranged to contact with each other, and a roll is interposed between each two adjacent filling members. This construction provides a flexible or yieldable support for the tread member which permits any portion of the tread member to yield inwardly and which causes each inward radial motion of any portion of the tread member to apply an outward pressure or increased pressure to an adjacent portion of the tread member thereby maintaining the tread member always under the proper tension while permitting the necessary yielding motion. When, therefore, a load is applied to the wheel and the portion of the tread member which is resting on the ground is forced inwardly toward the center of the wheel, the action of the corresponding filling members on the rolls will cause the rolls either side of such portion to move laterally thereby to crowd adjacent portions of the tread outwardly and hence maintain the tread at all times under the proper tension.

The rolls, filling members and tread member may be retained in their proper position relative to the rim 4 in any suitable way. One convenient way is by making the rim 4 channel-shaped, as shown, thereby providing the side flanges 7 between which the rolls 8 are secured and by making the filling members with the end grooves 13 into which inturned lips 14 on the outer edges of the flanges 7 are received. These grooves 13 are of sufficient width to permit the requisite radial movement of the filling members, as above described.

I have herein shown retaining rings 15 secured to the side flanges 7 of the rim 4 by suitable bolts 16, which retaining rings are provided at their outer edges with the lips 17 that partially embrace the tread member 9 and hold the latter in position.

In assembling the rim a majority of the rolls will first be placed in the rim, the corresponding number of filling members placed in position and the tread member 9 applied, after which the retaining members 15 may be secured in place. It is desirable that a sufficient number of rolls and filling members should be used to maintain the tread member under some tension, and to provide for adding a few extra rolls and filling members after the parts are assembled to secure this desired tension, I propose to make one of the retaining rings 15 with a radial slot 18 and also with two other slots 19 either side of the radial slot 18 and extending laterally thereto, and have also provided each roll 8 with a recess 20 in its end. This slot 18 is wide enough to receive a roll 8 and also a filling member 10. To insert an added roll or filling member, an implement may be inserted in each of the slots 19 and into a recess in the end of the roll 8 opposite the slot 19, and by manipulating the implement these rolls may be spread apart sufficiently to provide space for the insertion of an added roll and an added filling member through the slot 18. This operation may then be repeated to insert still another roll and filling member if necessary to provide the requisite number of rolls and filling members to secure the proper tension on the tread member. After a sufficient number of rolls and filling members have been inserted, the slot 18 may be closed by a closure 21 shown in dotted lines Fig. 1, and which is provided with wings 22 that overlie the retaining plate 15 and which are secured thereto by suitable screws or bolts.

I claim:

1. In a wheel having a resilient tire, the combination with a wheel body, of a channel-shaped rim applied thereto, the outer edges of said rim being provided with inwardly-directed lips, a plurality of rolls received between the side flanges of said rim and extending transversely thereof, an annular resilient tread member encircling said rim, and a plurality of filling members interposed between the tread members and said rolls, said filling members having wedge-shaped portions entering between the rolls and being provided at their ends with recesses in which the lips are received.

2. In a wheel having a resilient tire, the combination with a wheel body, of a rim applied thereto, an annular resilient tread member encircling said rim, but spaced therefrom, and a plurality of independent filling elements interposed between the tread member and rim, said filling members permitting any portion of the tread member to be moved inwardly on a radial line and such inward movement operating through the filling members to force adjacent portions of the tread member outwardly.

3. In a wheel having a resilient tire, the combination with a wheel body, of a channel-shaped rim applied thereto, an annular resilient tread member encircling said rim, a plurality of rolls received between the side flanges of said rim and extending transversely thereof, a plurality of separate filling members situated within the tread member and having wedge-shaped portions entering between said rolls, and annular retaining plates secured to the side flanges of the rim and engaging said tread member to retain it in position.

4. In a wheel having a resilient tire, the combination with a wheel body, of a channel-shaped rim applied thereto, an annular resilient tread member encircling said rim, a plurality of rolls received between the side flanges of said rim and extending transversely thereof, a plurality of separate filling members situated within the tread member and having wedge-shaped portions entering between said rolls, and annular retaining plates secured to the side flanges of the rim and engaging said tread member to retain it in position, one of said retaining members having an opening through which rolls and filling members may be inserted between the rim and tread member.

In testimony whereof, I have signed my name to this specification.

JOSEPH SPADAFORA.